United States Patent [19]
Ott

[11] Patent Number: 5,367,821
[45] Date of Patent: Nov. 29, 1994

[54] SUCTION INSECT TRAP APPARATUS

[76] Inventor: Gary D. Ott, Rte. 1 Box 803, Twisp, Wash. 98856

[21] Appl. No.: 136,899

[22] Filed: Oct. 18, 1993

[51] Int. Cl.$^5$ .............................................. A01M 3/00
[52] U.S. Cl. ........................................ 43/139; 43/134
[58] Field of Search ................................. 43/139, 134

[56] References Cited

U.S. PATENT DOCUMENTS

| | | | |
|---|---|---|---|
| 1,308,497 | 7/1919 | Jolly | 43/139 |
| 3,965,608 | 6/1976 | Schuman | 43/139 |
| 4,631,858 | 12/1986 | Kahle | 43/134 |
| 4,733,495 | 3/1988 | Winnicki | 43/134 |
| 4,817,330 | 4/1989 | Fahringer | 43/139 |
| 5,175,960 | 1/1993 | Wade et al. | 43/139 |

FOREIGN PATENT DOCUMENTS

R9498III/4-5K 9/1955 Germany .......................... 43/139

Primary Examiner—P. Austin Bradley
Assistant Examiner—Chuck Y. Mah
Attorney, Agent, or Firm—Gary Alan Culliss

[57] ABSTRACT

An insect trapping apparatus having a spring actuated vacuum pump for capturing an insect within a container. The apparatus utilizes a nozzle that automatically extends therefrom upon an actuation of the vacuum pump by a user. An insect drawn into the apparatus by the vacuum pump is captured within the container and may be selectively released therefrom by the user without excessive harm occurring to the insect.

3 Claims, 4 Drawing Sheets

SUCTION INSECT TRAP APPARATUS

BACKGROUND OF THE INVENTION

1. Field of the Invention

The present invention relates to insect traps and more particularly pertains to suction insect trap apparatuses which may be utilized to releasably capture an insect within a container.

2. Description of the Prior Art

The use of insect traps is known in the prior art. More specifically, insect traps heretofore devised and utilized for the purpose of capturing insects are known to consist basically of familiar, expected and obvious structural configurations, notwithstanding the myriad of designs encompassed by the crowded prior art which have been developed for the fulfillment of countless objectives and requirements.

For example, an electric insect trapping device having a vacuum pump disposed within a hollow body and an insect receiving cage is illustrated in U.S. Pat. No. 4,979,330. The device includes a nozzle that may be detached from the insect receiving cage while preventing the contents thereof from escaping.

Another patent of interest is an insect trap apparatus as described in U.S. Pat. No. 4,858,376 which utilizes a reversing motor that is positioned rearwardly of a conduit to selectively create a vacuum or a pressure between the conduit to secure and subsequently eject a trapped insect therewithin. The apparatus includes a plurality of handles selectively securable between the conduit and a battery pack to provide variable lengths and flexibilities in handle organizations.

While these devices fulfill their respective, particular objectives in requirements, the aforementioned patents do not describe a suction insect trap apparatus which may be utilized for capturing an insect within a container without excessive harm being done to the insect. Furthermore, the forgoing devices do not include an extensible nozzle that automatically extends upon an actuation of the apparatus.

In this respect, the suction insect trap apparatus according to the present invention substantially departs from the conventional concepts and designs of the prior art, and in so doing provides an apparatus primarily developed for the purpose of releasably capturing an insect within a container without excessive harm occurring to the insect.

SUMMARY OF THE INVENTION

In view of the foregoing disadvantages inherent in the known types of insect traps now present in the prior art, the present invention provides a new suction insect trap apparatus construction wherein the same can be utilized for releasably capturing an insect within a container without excessive harm occurring to the insect. As such, the general purpose of the present invention, which will be described subsequently in greater detail, is to provide a new suction insect trap apparatus which has many of the advantages of the insect traps mentioned heretofore and many novel features that result in a suction insect trap apparatus which is not anticipated, rendered obvious, suggested, or even implied by any of the prior art insect traps, either alone or in any combination thereof.

To attain this, the present invention essentially comprises a suction insect trapping apparatus having a spring actuated vacuum pump for capturing an insect within a container. The apparatus utilizes a nozzle that automatically extends therefrom upon an actuation of the vacuum pump by a user. An insect dragon into the apparatus by the vacuum pump is captured within the container and may be selectively released therefrom by the user without excessive harm occurring to the insect.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new suction insect trap apparatus which has many of the advantages of the insect traps mentioned heretofore and many novel features that result in a suction insect trap apparatus which is not anticipated, rendered obvious, suggested, or even implied by any of the prior art insect traps, either alone or in any combination thereof.

It is another object of the present invention to provide a new suction insect trap apparatus which may be easily and efficiently manufactured and marketed.

It is a further object of the present invention to provide a new suction insect trap apparatus which is of a durable and reliable construction.

An even further object of the present invention is to provide a new suction insect trap apparatus which is susceptible of a low cost of manufacture with regard to both materials and labor, and which accordingly is then susceptible of low prices of sale to the consuming public, thereby making such suction insect trap apparatuses economically available to the buying public.

Still yet another object of the present invention is to provide a new suction insect trap apparatus which provides in the apparatuses and methods of the prior art some of the advantages thereof, while simultaneously overcoming some of the disadvantages normally associated therewith.

Still another object of the present invention is to provide a new suction insect trap apparatus which may be utilized for releasably capturing an insect within a container without excessive harm occurring to the insect.

Yet another object of the present invention is to provide a new suction insect trap apparatus which utilizes a nozzle that automatically extends therefrom upon an actuation of the apparatus by a user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
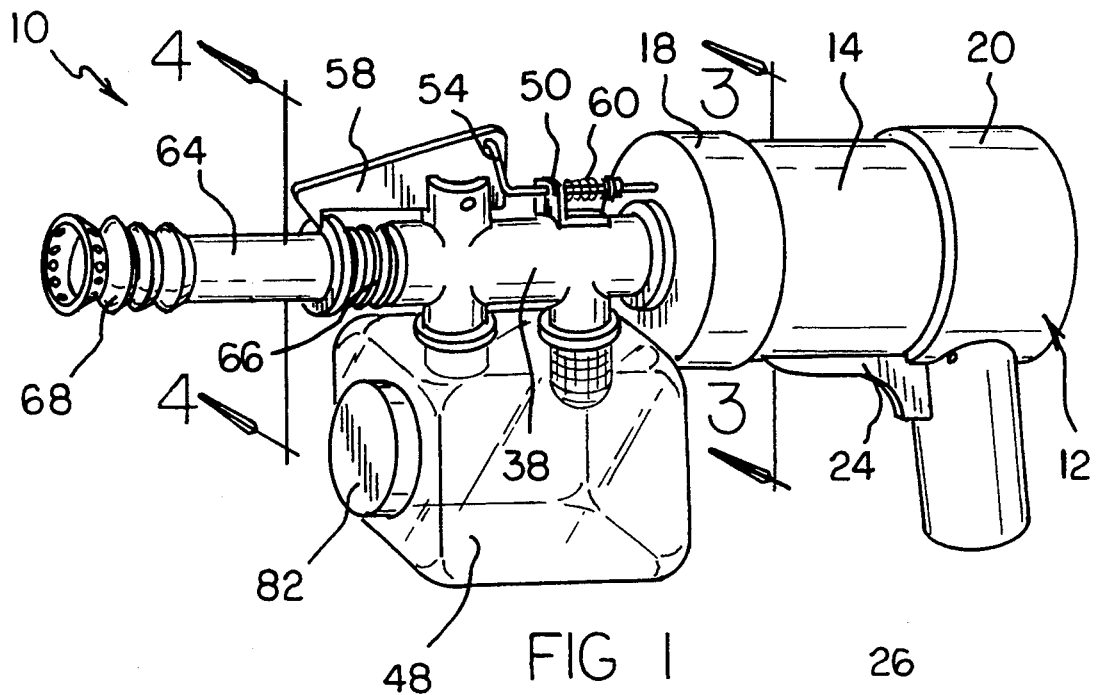
FIG. 1 is a perspective view of a suction insect trap apparatus comprising a first embodiment of the present invention.
Figure 2:
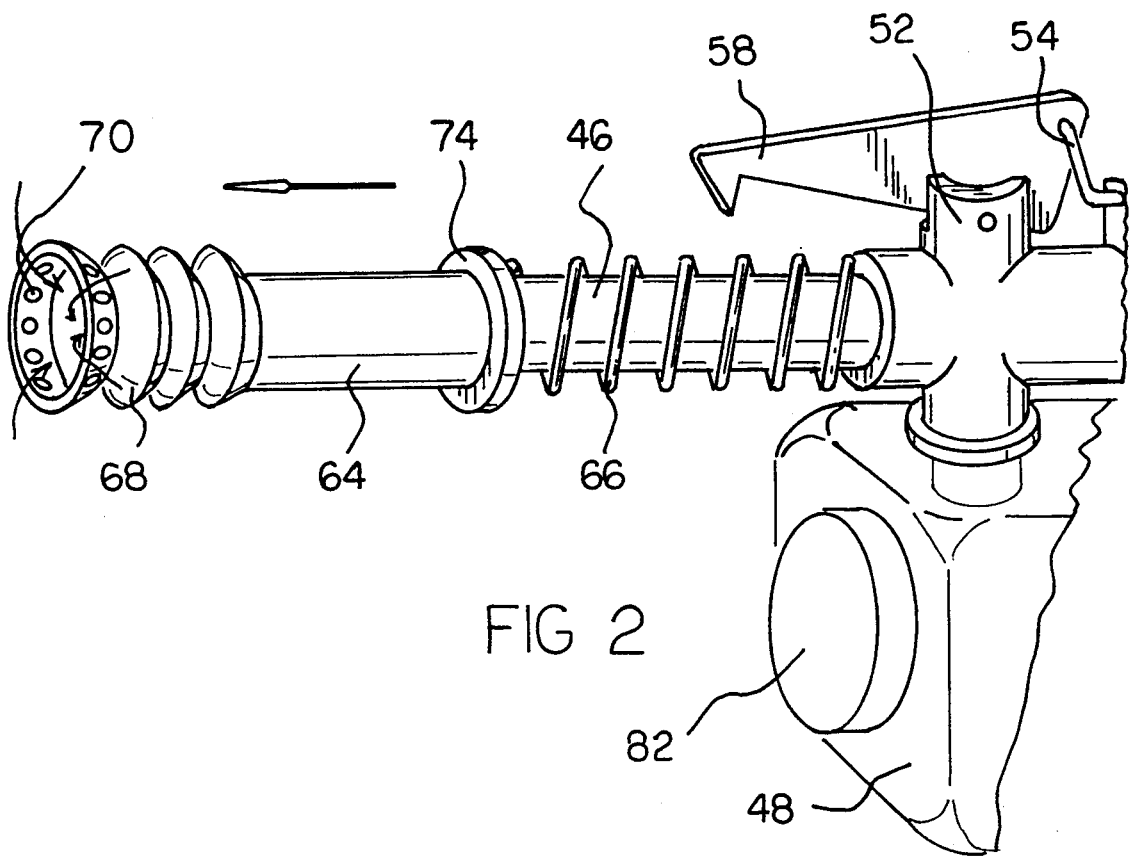
FIG. 2 is an enlarged perspective view of a portion of the present invention.

With reference now to the drawings, and in particular to FIGS. 1-5 thereof, a first embodiment of a new suction insect trap apparatus embodying the principles and concepts of the present invention and generally designated by the reference numeral 10 will be described.

Figure 3:
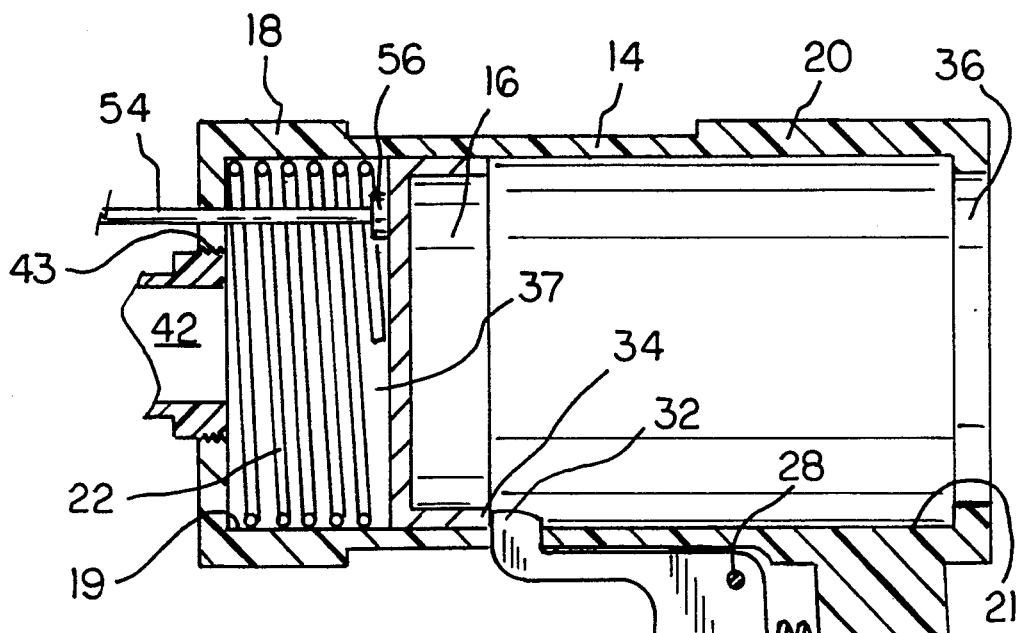
FIG. 3 is a cross-section view taken along line 3—3 of FIG. 1.

More specifically, it will be noted that the suction insect trap apparatus 10 comprises a vacuum body assembly 12 for creating suction. The vacuum body assembly 12 is comprised of a substantially hollow cylinder 14 sized to receive and slidably support a piston 16 therewithin. The piston 16 is captured within the cylinder 14 by a neck 18 positioned at a front end 19 of the cylinder and a retainer 20 positioned at a rear end 21 of the cylinder. The piston 16 is biased towards the rear end 21 of the cylinder 14 by a piston spring 22 that engages both the neck 18 and the piston 16, as best shown in FIG. 3.

The piston 16 may be selectively secured in a predetermined position within the cylinder 14 by a trigger 24. The trigger 24 is supported by a handle 26 that is integrally or otherwise connected to the retainer 20. The trigger 24 is pivotally supported by both a trigger pin 28 and a trigger spring 30 which is operable to bias a portion 32 of the trigger 24 into the cylinder 14 to engage a portion 34 of the piston 16, as best illustrated in FIG. 3. The retainer 20 includes an opening 36 that allows a user to push the piston 16 towards the front end 19 of the cylinder 14, whereby the portion 32 of the trigger 24 may automatically engage the piston to secure it in the predetermined position. Upon an actuation of the trigger 24 by a user, the piston 16 will be biased towards the rear end 21 of the cylinder 14 by the piston spring 22 which will create a vacuum within an interior space 37 of the vacuum body assembly 12. The piston 16 is precluded from exiting the cylinder 14 by the retainer 20 to prevent a disassembly thereof.

Figure 4:
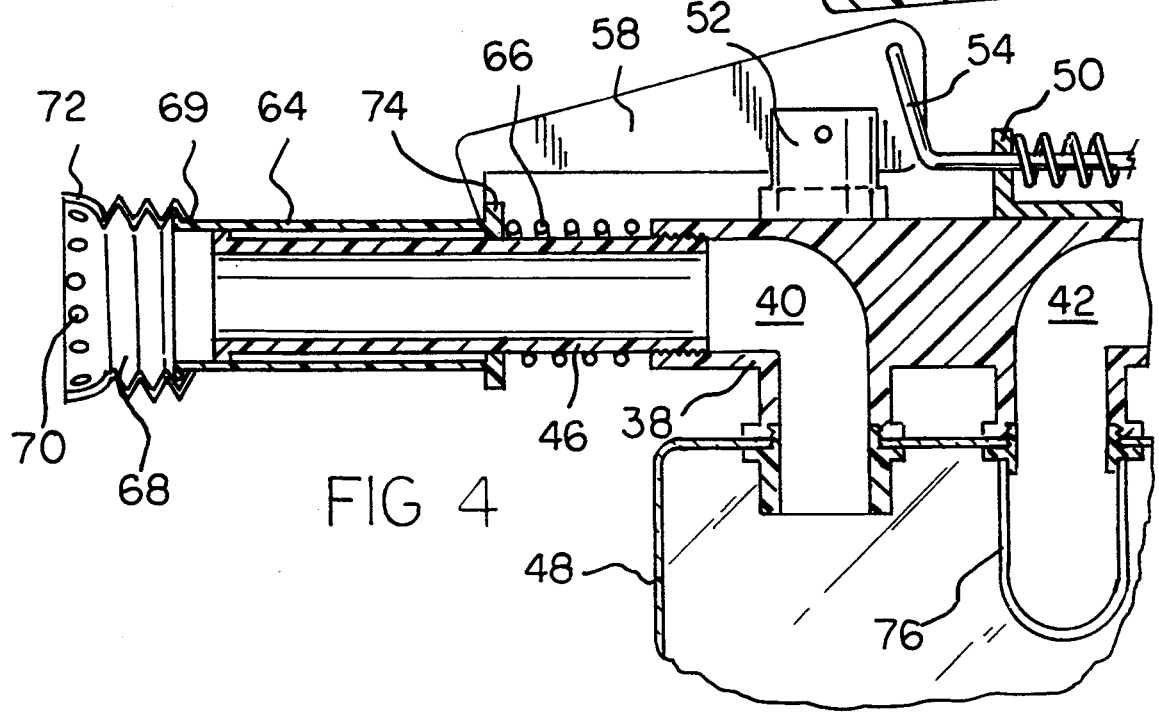
FIG. 4 is a cross-section view taken along line 4—4 of FIG. 1.
Figure 5:
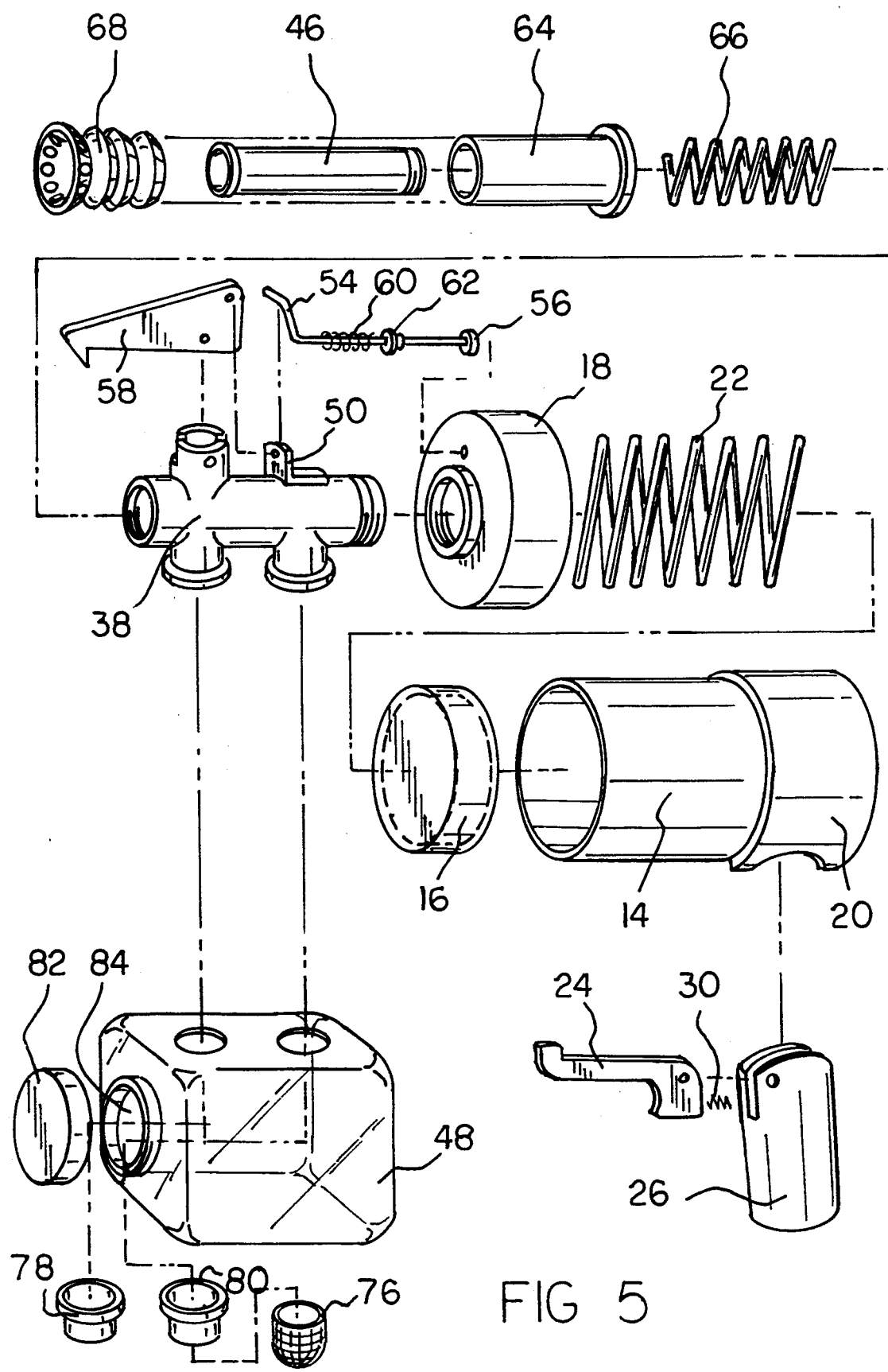
FIG. 5 is an exploded view of the present invention.

The vacuum body assembly 12 is connected to a manifold 38 at the front end 19 of the cylinder 14. The manifold 38 includes an intake port 40 and a vacuum port 42 located on respectively opposed ends (not labeled) of the manifold. The vacuum port 42 is threadably or otherwise engaged to the neck 18 of the vacuum body assembly 12 which allows fluid communication between the vacuum port and the interior space 37 within the cylinder 14 through a neck aperture 43. The intake port 40 is threadably or otherwise engaged to a barrel 46 which projects away from the manifold 38 and is comprised of a substantially straight, hollow tubular member. Both the intake port 40 and the vacuum port 42 are in fluid communication with a container 48 that is supported by the manifold, as best shown in FIG. 4.

The manifold 38 supports the container 48, a bracket 50, and a pivot support 52 thereon. The bracket 50 is operable to slidably support an arm 54 which projects through an unlabeled aperture in the neck 18 and into the interior space 37 of the cylinder 14. The arm 54 includes a bumper 56 that is operable to be engaged by the piston 16 when the piston is in the predetermined position within the cylinder 14. The arm 54 is mechanically coupled to a release 58 which is supported by the pivot support 52 upon the manifold 38. An arm spring 60 is captured upon the arm 54 and is positioned between both the bracket 50 and a spring support 62. The spring support 62 is fixedly secured to the arm 54 so that upon a movement of the piston 16 to the rear end 21 of the cylinder 14, the arm 54 will cause the release 58 to pivot upon the pivot support 52.

Slidably disposed upon the barrel 46 is an extension 64 that is biased away from the manifold 38 by an extension spring 66 upon a pivoting of the release 58. The extension 64 is comprised of a substantially hollow, tubular member that has an accordion style boot 68 positioned on an end 69 thereof. The extension 64 is operable to extend a reach of the barrel 46 automatically upon an actuation of the vacuum body assembly 12 by the trigger 24. The boot 68 provides a cushion between the extension 64 and other objects. The boot 68 includes a plurality of apertures 70 located along a perimeter 72 thereof to preclude the boot from becoming engaged to an object from the vacuum generated by the vacuum body assembly 12.

In use, the suction insect trap apparatus 10 may be cocked by pushing the piston 16 to the front end of the cylinder 14 and by pushing the extension 64 towards the manifold 38 so that the release 58 may engage a ridge 74 to hold the extension in place. The present invention 10 may then be placed near an insect residing upon an object, such as a wall and the like, and operated by an actuation of the trigger 24. Upon an actuation of the trigger 24, the piston 16 will be biased towards the rear end 21 of the cylinder 14 by the piston spring 22, thus creating a vacuum in the interior space 37 of the vacuum body assembly 12. As the piston 16 moves away from the bumper 56, the arm 54 is biased by the arm spring 60 to cause a pivoting of the release 58 away from the ridge 74 of the extension 64, thus causing the extension spring 66 to bias the extension away from the manifold 38. Simultaneously, air is drawn in through both the barrel 46 and the container 48 and into the interior space 37 to satisfy the vacuum created by the piston 16 as it moves within the cylinder 14. The boot 68 serves to trap the insect against the object while the apertures 70 allow air to move the insect through the intake port 40 and into the container 48. The insect is precluded from entering the vacuum body assembly 12 by a screen 76 positioned within the container 48.

A pair of Joiners 78, 80 are utilized to secure the container 48 to both the intake port 40 and the vacuum port 42, respectively, of the manifold 38. By removing the Joiners 78, 80, the container 48 may be removed from the manifold 38. A captured insect may be selectively released from the container 48 by removing a cap 82 which is rotatably coupled to an opening 84 in the container.

Figure 6:
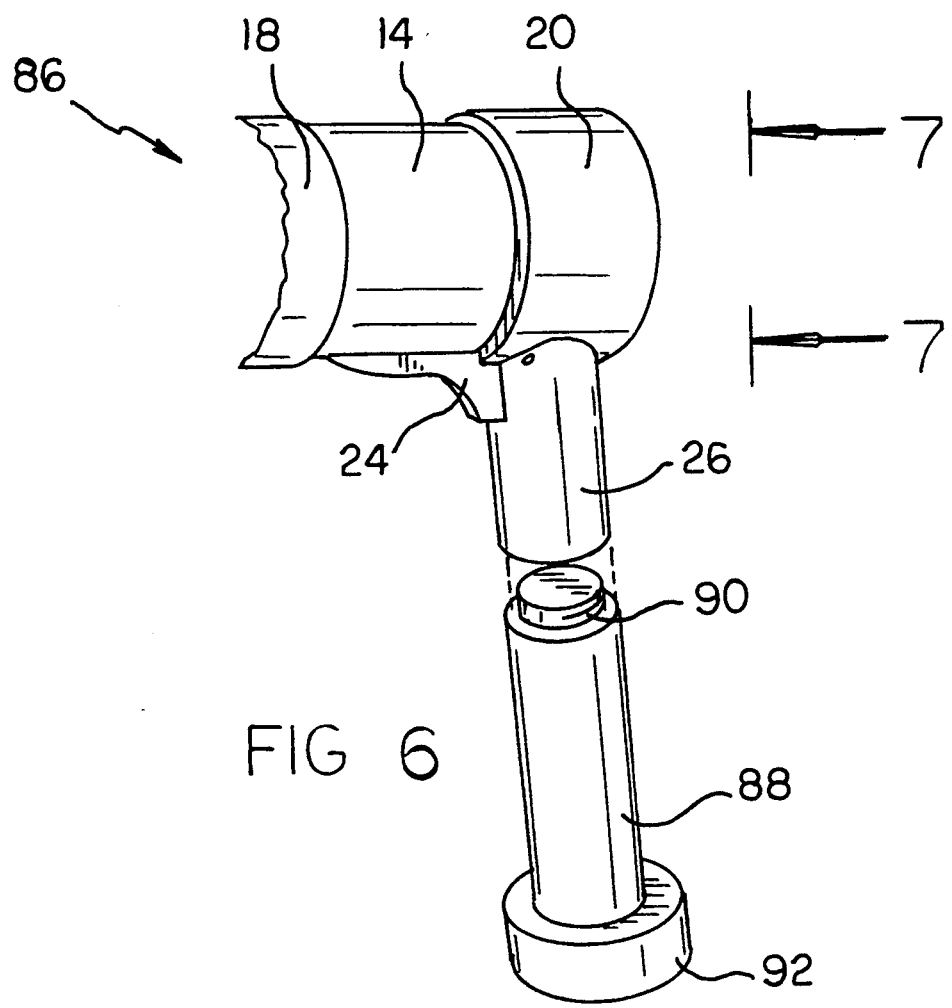
FIG. 6 is a perspective view of a portion of a second embodiment of the invention.
Figure 7:
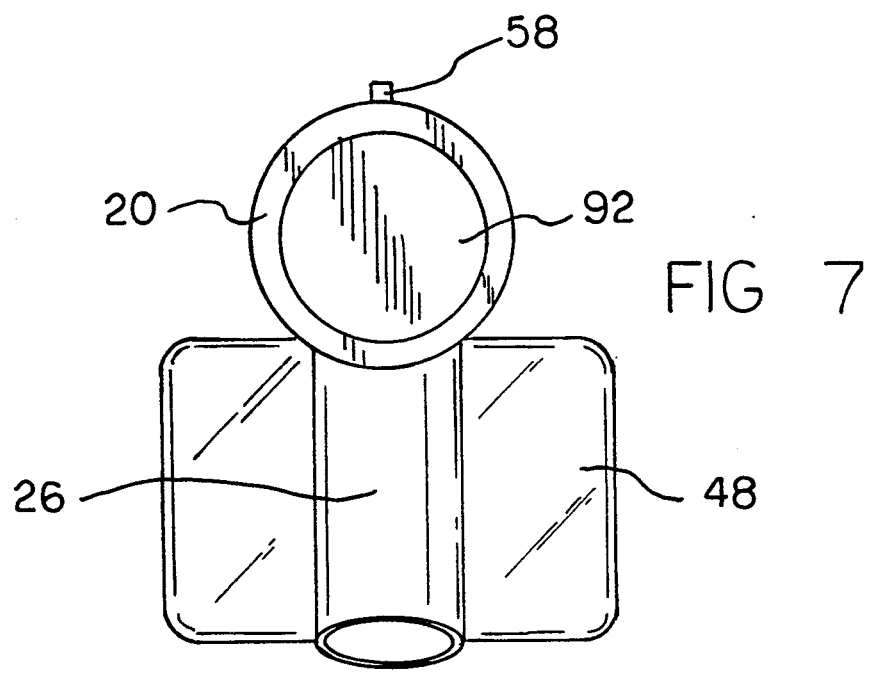
FIG. 7 is a rear elevation view of the second embodiment of the invention.

A second embodiment of the present invention as generally designated by the reference numeral 86, which comprises substantially all of the features the foregoing embodiment 10 and which further comprises a handle extension 88 will now be described. As best shown in FIGS. 6-7, it can be shown that the handle extension 88 is releasably coupled to the handle 26 by threads 90 located on the handle extension which are operable to engage threads (not shown) located on an interior of the handle. The handle extension 88 includes a knob 92 located at a lower end thereof. The handle extension 88 may be removed from the handle 26 in a well understood manner and utilized as a tool for biasing the piston 16 to a front end of the cylinder 14 by placing the handle extension within the cylinder through the opening 36 in the retainer 20, as best illustrated in FIG. 7. Once the piston 16 is captured by the trigger 24, the handle extension 88 may be removed from the cylinder 14 and re-engaged to the handle 26 for storage.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new suction insect trap apparatus comprising:
   a manifold having at least one port aperture therethrough;
   a barrel coupled to said manifold in fluid communication with said at least one port aperture;
   a container mounted to said manifold in fluid communication with said at least one port aperture;
   a vacuum means in fluid communication with said container for creating a vacuum within said container, said vacuum means comprising a cylinder coupled to said manifold, said cylinder and said manifold both being in fluid communication with said container, a piston slidably disposed within said cylinder, a trigger pivotally coupled to a portion of said cylinder for releasably securing said piston in a predetermined position within said cylinder, and a spring mechanically engaged to both said cylinder and said piston to cause an axial translation of said piston with respect to said cylinder upon an actuation of said trigger;
   and,
   an extension tube concentrically, slidably disposed upon said barrel, a ridge fixedly secured to said extension tube, a release member pivotally mounted to said manifold, said release member being engagable to said ridge for securing said extension tube in a predetermined position, a further spring coupled to said barrel to cause an axial translation of said extension tube relative to said barrel upon an actuation of said release member, and an arm mechanically coupled to both said trigger and said release member.

2. The new suction insect trap apparatus of claim 1 and further comprising a boot means positioned on an end of said extension tube for trapping an insect between said boot means and an object.

3. The new suction insect trap apparatus of claim 2 and further comprising a handle fixedly secured to said cylinder for allowing a user to grasp and manipulate said suction insect trap apparatus, and a handle extension releasably coupled to said handle, said handle extension being removable from said handle and operable by a user to move said piston with respect to said cylinder.

* * * * *